United States Patent [19]
Yamaji et al.

[11] Patent Number: 5,551,392
[45] Date of Patent: Sep. 3, 1996

[54] ENGINE AIR INTAKE SYSTEM

[75] Inventors: Toshio Yamaji; Nobumitsu Tanaka, both of Tokyo, Japan

[73] Assignee: Fuji Jukogyo Kabushiki Kaisha, Tokyo, Japan

[21] Appl. No.: 317,641

[22] Filed: Sep. 30, 1994

[30] Foreign Application Priority Data

Oct. 19, 1993 [JP] Japan .................................. 5-260708

[51] Int. Cl.⁶ ...................................................... F02B 31/00
[52] U.S. Cl. ..................... 123/306; 123/308; 123/188.14
[58] Field of Search .............................. 123/188.14, 308, 123/432, 193.4, 302, 306

[56] References Cited

U.S. PATENT DOCUMENTS

| | | | |
|---|---|---|---|
| 4,323,038 | 4/1982 | Motosugi et al. | 123/188.14 |
| 4,336,776 | 6/1982 | Sumiyoshi et al. | 123/188.14 |
| 4,732,117 | 3/1988 | Tanahashi et al. | 123/193.4 |
| 4,760,821 | 8/1988 | Aupor et al. | 123/188.14 |
| 4,883,030 | 11/1989 | Tanahashi et al. | 123/432 |
| 5,165,374 | 11/1992 | Chapman et al. | 123/308 |
| 5,255,649 | 10/1993 | Isaka | 123/308 |
| 5,273,014 | 12/1993 | Mitobe et al. | 123/308 |

*Primary Examiner*—Erick R. Solis
*Attorney, Agent, or Firm*—Beveridge, DeGrandi, Weilacher & Young, L.L.P.

[57] ABSTRACT

Disclosed is an apparatus for generating a tumble in a cylinder of a fuel injection engine in order to improve combustion. The apparatus comprises an air intake passage having a straight portion whose center line is approximately in parallel with a roof face of the combustion chamber on the exhaust valve side and a tumble control valve for generating a tumble in the cylinder. The tumble control valve is a flap valve or a butterfly valve for closing a second air intake passage and for opening a first air intake passage.

16 Claims, 6 Drawing Sheets

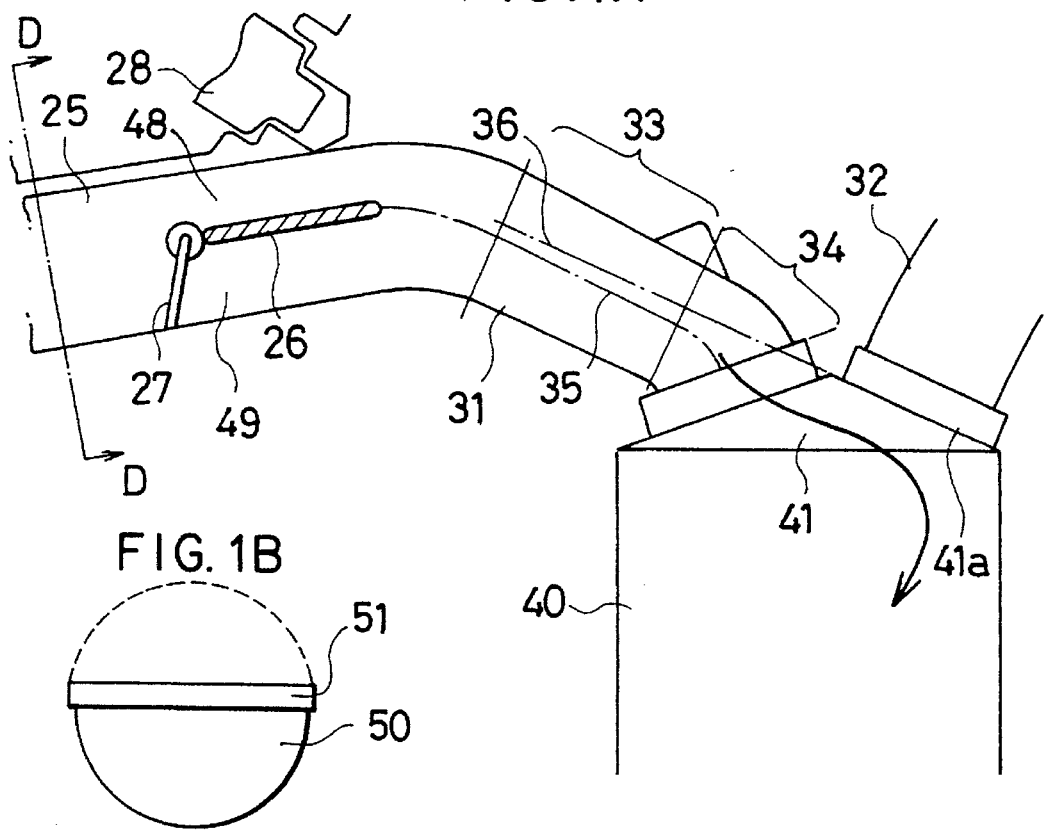
FIG. 1A
FIG. 1B
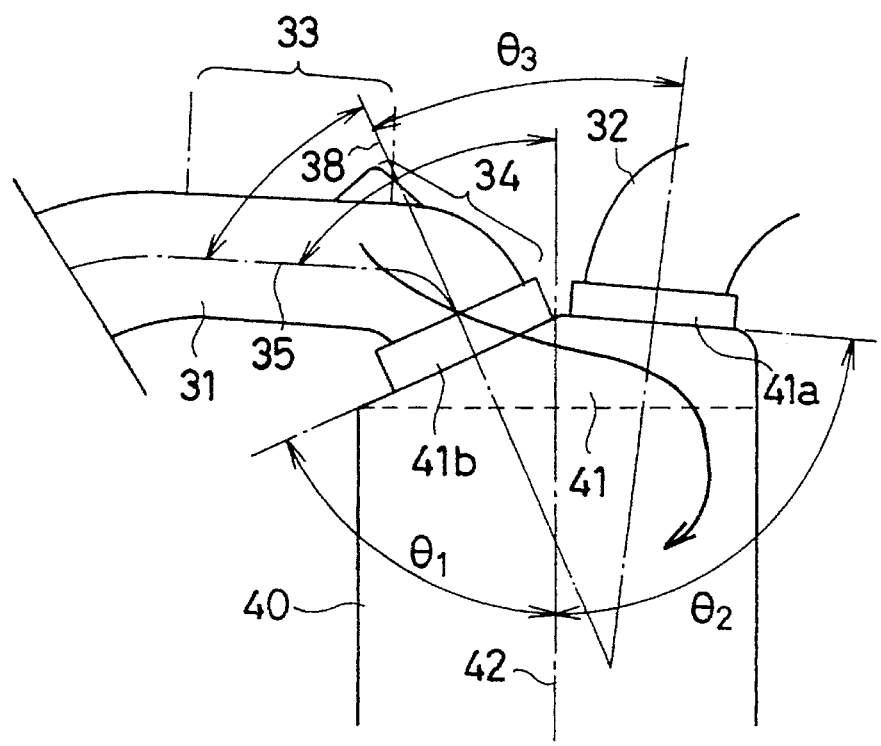
FIG. 2

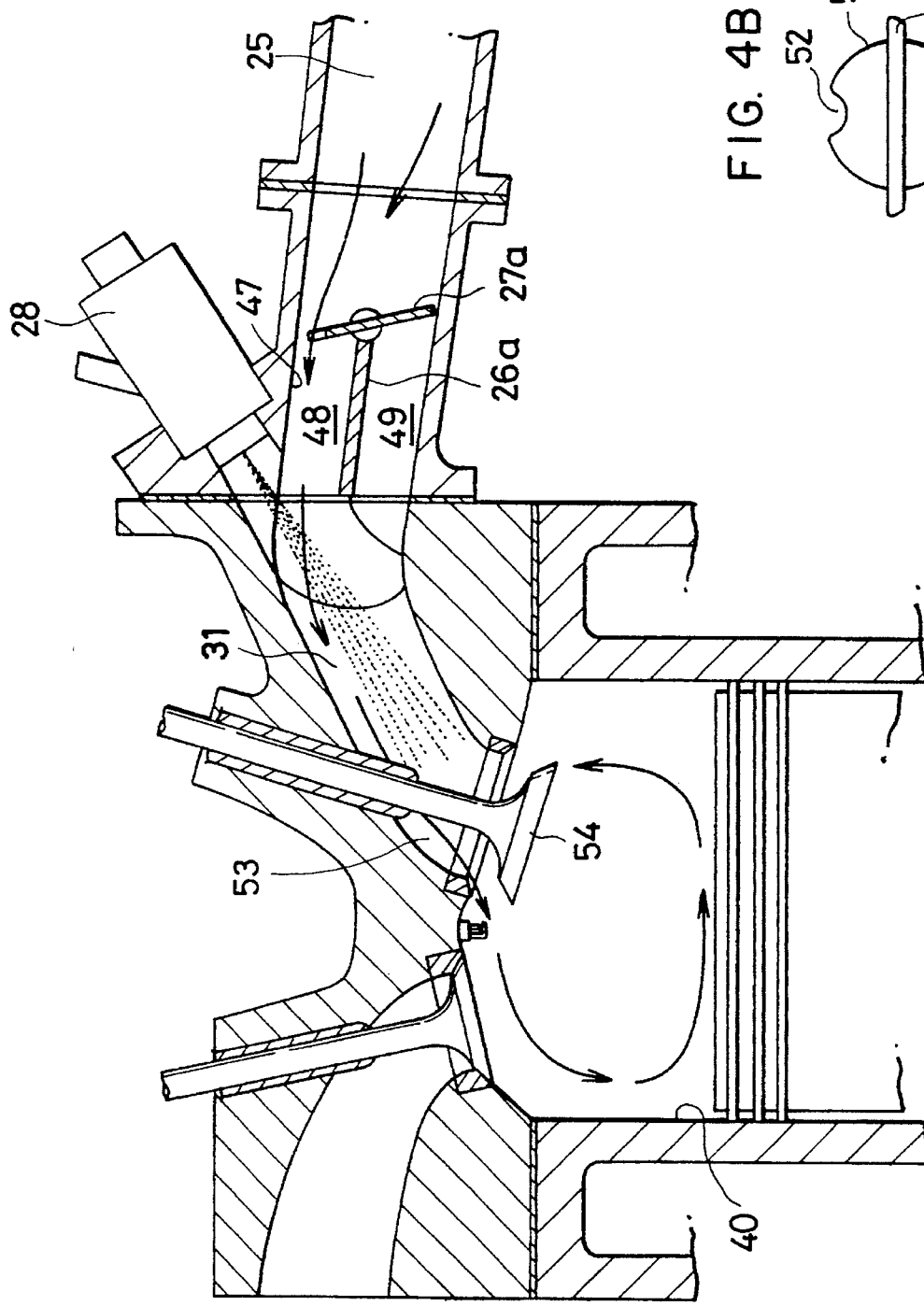
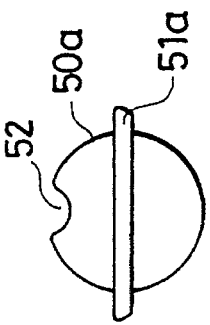

ENGINE AIR INTAKE SYSTEM

TECHNICAL FIELD

The present invention is concerned with an apparatus for improving an engine air intake system and specifically concerned with an apparatus capable of generating a stronger tumble flow in cylinders by modifying the configuration of the engine air intake port.

BACKGROUND ART

Recently, fuel injection techniques have been dominant in automobile engines since the fuel injection system has a larger possibility of improving fuel consumption and exhaust emissions than other fuel systems.

Basically, there are two methods of the fuel injection in which one is an intake manifold (intake port) injection method, or a port injection method and the other is a direct injection method. In the intake manifold injection method, fuel is injected under a low pressure into an air intake conduit through a fuel injector disposed at the intake manifold. On the other hand, in the direct injection method, fuel is injected under a high pressure directly into a cylinder from a fuel injector disposed in the combustion chamber.

Particularly in the former intake manifold injection method, when fuel is injected towards the air flow in the intake manifold, air and fuel are mixed up by the turbulence of the air flow and then the mixture of air and fuel is burned in the cylinder. However, when the engine is operated at light loads, the air flow in the intake manifold is so slow in speed that the injected fuel is burned in an insufficient state of atomization in the cylinder, consequently the combustion efficiency is degraded.

In order to avoid this degraded combustion efficiency at the light loading, there have been disclosed many techniques by which the mixing of air and fuel is performed efficiently by generating a swirl flow or a tumble flow in the cylinder.

Here, the swirl flow abovementioned is an air flow rotating circumferentially along the wall surface of the cylinder and the tumble flow is an air flow circulating in the direction of the cylinder axis. It is known that the swirl flow has a large effect on homogenizing the air and fuel mixture but it has little effect on accelerating combustion by the generation of the turbulence. On the other hand, it is known that the tumble flow is effective to improve the combustion at the light loading of an engine by the strong turbulence effect which is caused when the tumble flow is broken near the end of the compression stroke.

As one example of the technology employing this tumble technology, Japanese Utility Application No. Jitsu-Kai-Hei 3-99833 discloses an intake port as illustrated in FIG. 7.

The intake port is so designed that a straight portion of the conduit is formed upstream of the intake port 1 and a center line 2 of the straight portion abuts on the valve seat 5 of the exhaust valve 4 on the sectional plane containing a center line 2 of the intake port 1.

However, in this construction, especially when an angle formed by the intake valve stem and the exhaust valve stem is small, the straight portion of the intake valve seat 3 (portion B enclosed with a circle mark) is inevitably lengthened to avoid a power loss due to a decrease of the effective section of the intake port. The result is that an air flow vector sufficient to generate a tumble flow can not be obtained.

As another example of the tumble flow technology, Japanese Patent Application No. Toku-Kai-Hei 2-301618 discloses a configuration of the combustion chamber for an internal combustion engine, as illustrated in FIG. 8 and FIG. 9. The combustion chamber is formed by four conical surfaces and respectively two intake and exhaust valves are provided on each conical surface. Further, in this prior art a ridge line dividing an intake valve side and an exhaust valve side is offset to the exhaust side so as to generate a tumble flow more easily. In this configuration a "masking effect" tends to occur at the valve seat of the intake valve 6 and further the combustion tends to become bad due to so many embosses and engraves on the surface of the combustion chamber.

As a further example of the prior art, Japanese Utility Application No. Jitsu-Gan-Sho 61-141457 discloses an induction system for an internal combustion engine as shown in FIG. 10. This prior art proposes a configuration of the combustion chamber 9 in which an intake port 8 is formed in such a way that the center line 10 of the intake port 8 is slanted more to the horizontal direction than the center line 11 of the intake valve stem and further a concave part 14 is provided at the opposite side of the intake valve 13 on the top surface of the piston According to this prior art, the tumble flow is effectively generated by the concave part 14 which is disposed on the opposite side of the intake valve 13. However, since the concave part 14 is offset against the axis of the cylinder 15, the tumble flow can not be kept alive after the bottom dead center of the piston 12.

The aforementioned prior art is concerned with modifications made to the configuration of the combustion chamber or the intake port. However, there is one example of the prior art using some additional equipment for generating a tumble flow as shown in Japanese Patent Application No. Toku-Kai-Sho 58-124019 which discloses a tumble control valve disposed upstream of the intake port in order to generate a deflected stream in the intake port. In that prior art, however, the deflected stream generated by the tumble flow control valve is weakened relatively at the early stage of generation, because there is no separate conduit only for letting flow the deflected stream, therefore, a strong tumble flow can not be expected to be generated in the cylinder.

SUMMARY OF THE INVENTION

It is an object of the present invention to provide a configuration of an air intake passage for a fuel injection engine so as to generate a tumble flow in a cylinder easily. It is another object of the present invention to provide an apparatus for generating a deflected rapid air stream in an air intake passage which thereafter produces a tumble flow in a cylinder.

Described is an apparatus comprising:

an air intake passage including a straight portion provided on the upstream side of the air intake passage;

the air intake passage including a center line of the straight portion approximately in parallel with a roof face of the combustion chamber on the exhaust valve side so as to introduce air into the combustion chamber without disturbing a streamline formed at the straight portion and to generate a tumble flow in the cylinder;

a dividing wall provided upstream of the air intake passage for dividing the air intake passage into a first passage and a second passage, the first passage provided farther from the cylinder than the second passage; and a flap valve hinged on the dividing wall for generating a rapid air stream in the air intake passage by letting intake air flow through the first passage by means of closing the second passage with the flap valve when the engine is operated at a predetermined operating condition.

BRIEF DESCRIPTION OF THE DRAWINGS

FIG. 1 (a) is a schematic drawing showing an air intake system of an engine according to a first embodiment of the present invention.

FIG. 1 (b) is a view of D—D section showing an elevational configuration of a tumble control valve according to the first embodiment of the present invention.

FIG. 2 is a schematic drawing showing an air intake system of an engine according to a second embodiment of the present invention, when a configuration of the combustion chamber of FIG. 1 is changed.

FIG. 4 (a) is a schematic drawing showing an air intake system of an engine according to a fourth embodiment of the present invention, when a modification has been made to a tumble control valve of FIG. 1.

FIG. 4 (b) show a valve associated with FIG. 4 (a).

FIG. 5 (b) is a top view of FIG. 5 (a).

FIG. 6 (b) is a top view of FIG. 6 (a).

DETAILED DESCRIPTION OF THE PREFERRED EMBODIMENT

Figure 3:
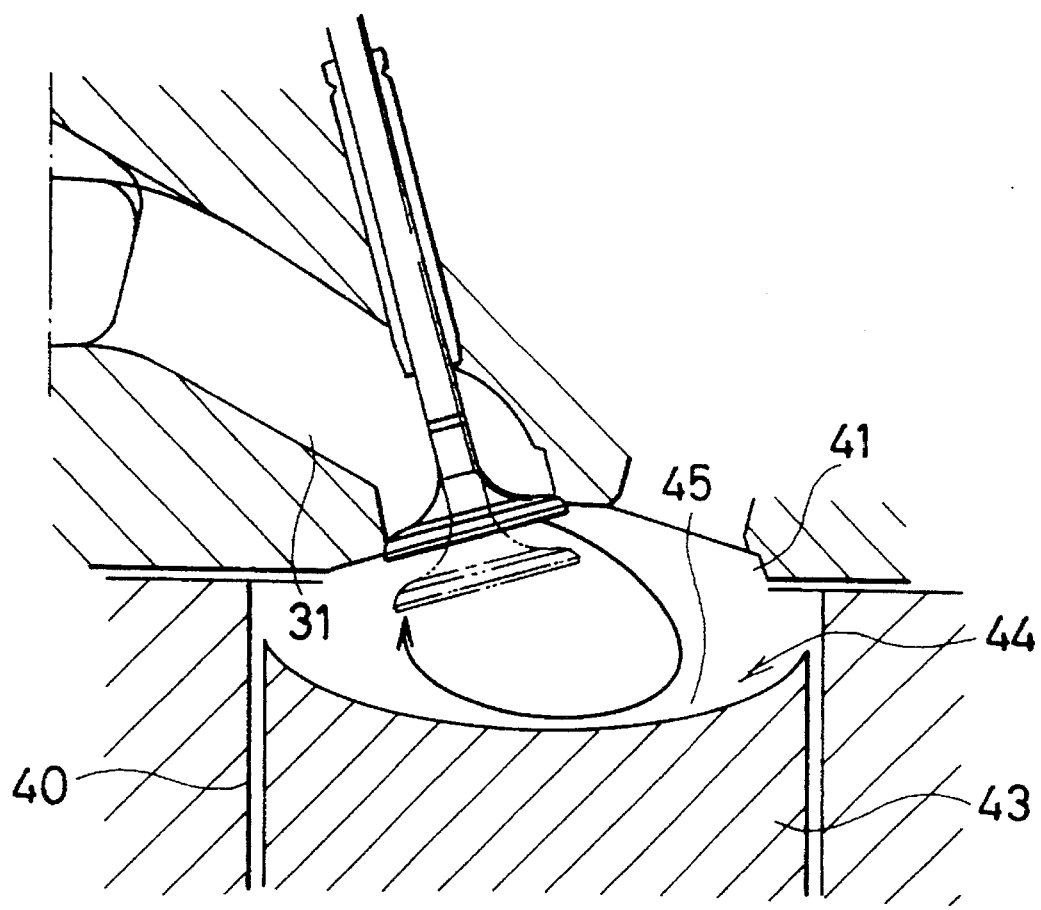
FIG. 3 is a schematic drawing showing an air intake system of an engine according to a third embodiment of the present invention, when a configuration of the piston is changed in FIG. 1.

Referring now to FIG. 1 (a), in intake conduit 25 of an engine intake system there is provided separator 26 by which intake conduit 25 is separated into upper passage 48 and lower passage 49. Tumble flow control valve 27 is a valve known as "a flap type" with its hinge 51 connected to the upstream end of separator 26. Further, as shown in FIG. 1 (b), flap 50 of tumble flow control valve 27 is operated pivotally so as to close or open only lower passage 49.

When the engine is operated at light loads, tumble control valve 27 acts to pass intake air with high speed through upper passage 48 of intake conduit 25 because lower passage 49 is fully closed with flap 50, as shown in FIG. 1 (a).

Here, the term "light loads" or "heavy loads" used in the present invention does not mean the meaning commonly used. For convenience of this invention, the engine operational condition is divided into two conditions, one is "light loads" where the engine is relatively at light loads and another is "heavy loads" where the engine is relatively at heavy loads. Whether the engine is at light loads or heavy loads is determined by referring to a predetermined map parameterizing, for example, an engine speed and a fuel injection amount.

Further, fuel injector 28 is disposed downstream of intake conduit 25 with its nozzle (not shown) oriented toward intake port 31. Intake port 31 is provided downstream of intake conduit 25 and is open to combustion chamber 41 through an intake valve. Also, exhaust port 32 is formed in the vicinity of intake port 31.

In an engine having a pent-roof type combustion chamber, there are provided with straight portion 33 upstream of intake port 31 and with bent portion 34 immediately following straight portion 33. The configuration of intake port 31 is determined in such a way that center line 35 of straight portion 33 is approximately parallel with an extended line of roof line 41a of the pent-roof type combustion chamber 41 on the exhaust port 32 side.

In the engine intake system thus constituted, when the engine is operated at light loads, the intake air flows with high speed through the upper passage of intake conduit 25 by closing the lower passage thereof by means of the rotational operation of tumble control valve 27. Since the intake air flows smoothly along roof line 41a of combustion chamber 41 into cylinder 40, the tumble is efficiently generated therein, whereby combustion is improved at the engine light loads condition.

FIG. 2 is a schematic view showing the intake system according to the second embodiment, In the following description, the same numerals will be used as are used in FIG. 1 and duplicate descriptions will not be done.

As illustrated in FIG. 2, the combustion chamber according to the second embodiment is determined in such a way that an angle $\theta_2$ contained by roof line 41a of combustion chamber 41 on the exhaust port 32 side and an axis of cylinder 42 is substantially larger than an angle $\theta_1$ contained by roof line 41b of combustion chamber 41 on the intake port 31 side and an axis of cylinder 42.

In this intake system thus constituted, since a substantially small angle can be taken with respect to the angle $\theta_1$, center line 35 of straight portion 33 of intake port 31 and cylinder axis 42 meet at a near right angle. Consequently, the angle contained by center line 35 of straight portion 33 of intake port 31 and the intake valve stem becomes obtuse, thereby the radius of curvature at bent portion 34 of intake port 31 can be made so large as to minimize the pressure drop in intake port 31.

This design method according to the second embodiment will be more effective in case where an angle $\theta_3$ contained by the intake valve stem and the exhaust valve stem is rather small.

FIG. 3 is a schematic drawing showing an intake system of an engine according to a third embodiment of the present invention, when a configuration of the piston is modified in the first or second embodiments. That is to say, in the third embodiment, bowl 45 is provided on piston head 44 of piston 43 in addition to intake systems according to the first or the second embodiments. Bowl 45 shown in FIG. 3 has a configuration of hemispherical concave so as to let flow the tumble smoothly along the wall of the cylinder and the piston head and to keep that tumble stream without being disturbed for a long time.

FIG. 4 (a) is a schematic drawing showing an intake system of an engine according to a fourth embodiment of the present invention, when a modification has been made to tumble control valve 27 in the first embodiment. In FIG. 4 (a) according to the fourth embodiment, with respect to the separator and the tumble control valve, numerals will be designated hereinafter as 26a and 27a respectively.

The tumble control valve 27a according to this embodiment is a valve known as "butterfly type" with its rotational axis 51 connected to the upstream end of separator 26a. Valve disk 50a of control valve 27a is extended to both upper passage 48 and lower passage 49 and has notch 52 at the edge of valve disk 50a on the upper passage 48 side.

When the engine is operated at light loads where a tumble is needed for combustion improvement, tumble control valve 27a is at a fully closed position as illustrated in FIG. 4 (a). With this valve position the intake air flows only into upper passage 48 through an opening formed between notch 52 of tumble control valve 27a and upper wall 47 of induction passage 25. The intake air guided by upper passage 48 grows into a strong deflected stream in intake port 31 and then the fuel is injected into that stream from fuel injector 28. Then air and fuel flow into cylinder 40 in a deflected stream through an upper side 53 of intake valve 54 and consequently the tumble flow is generated in cylinder 40 as shown in FIG. 4 (a). On the other hand, when the engine is operated at heavy loads, since no tumble is needed at these operating conditions, tumble control valve 27a is set at the wide open position where both upper passage 48 and lower passage 49 are fully open.

Figure 5A:
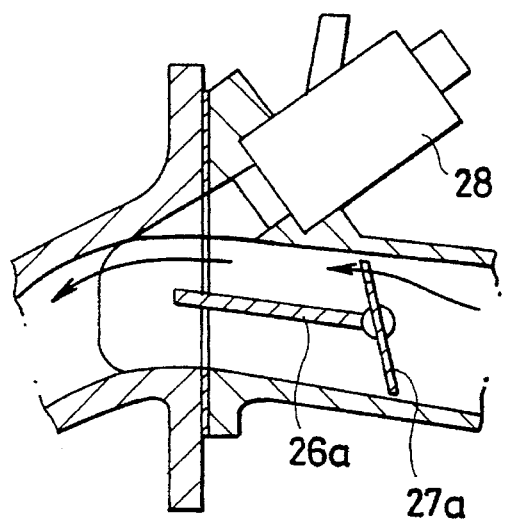
FIG. 5 (a) is a schematic drawing showing an example of variations of the fourth embodiment.
Figure 5B:
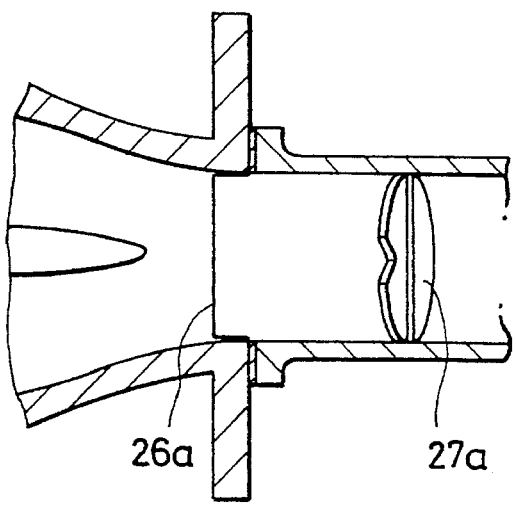
Figure 6A:
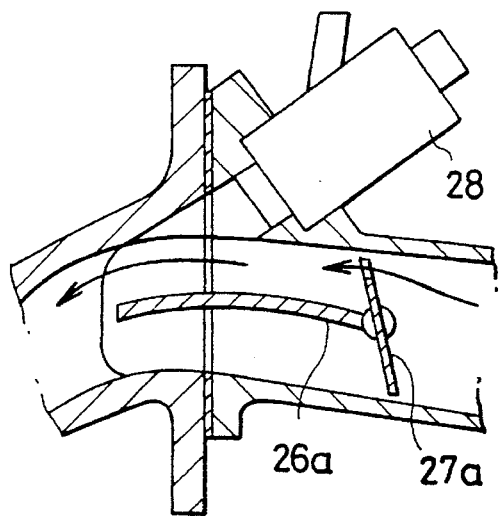
FIG. 6 (a) is a schematic drawing showing another example of variations of the fourth embodiment.
Figure 6B:
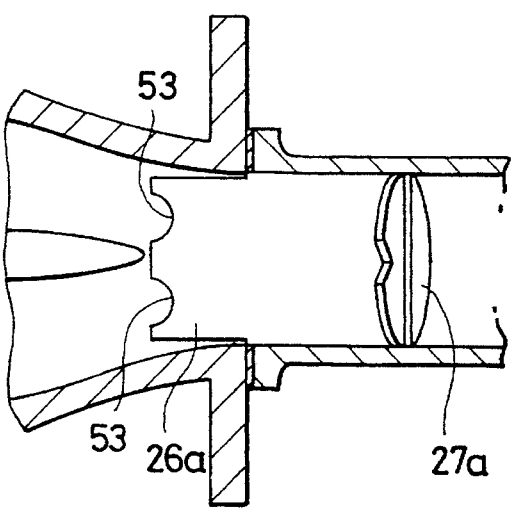
Figure 7:
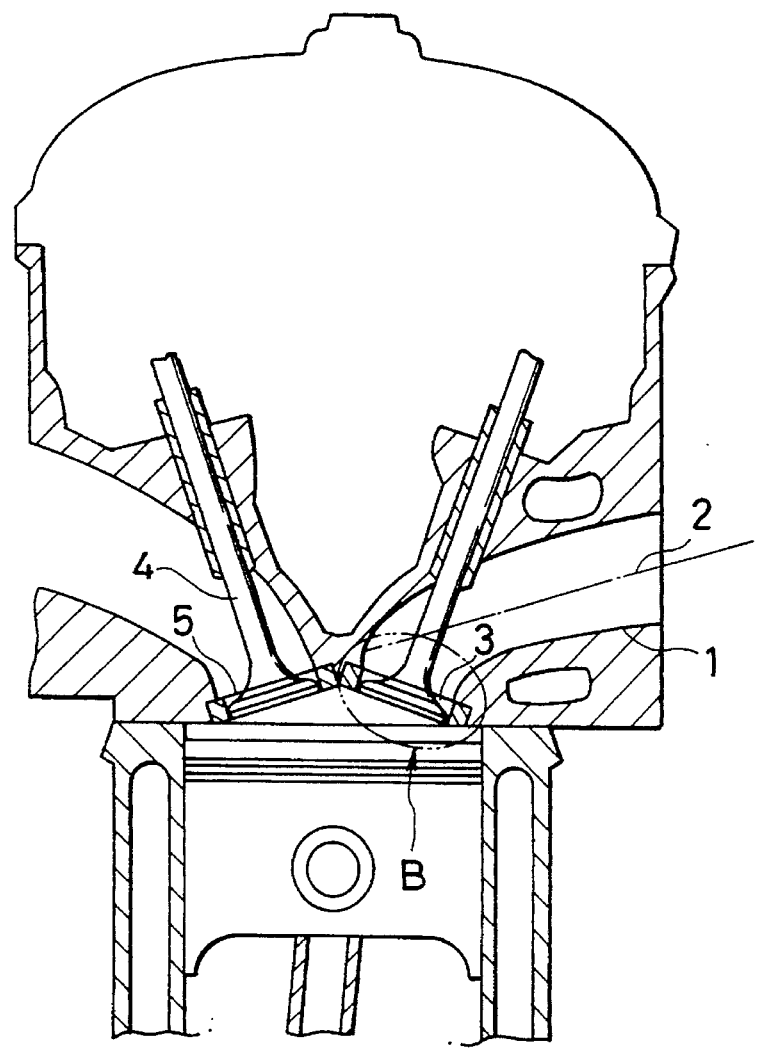
FIG. 7 is a sectional view of an intake port according to a prior art.
Figure 8:
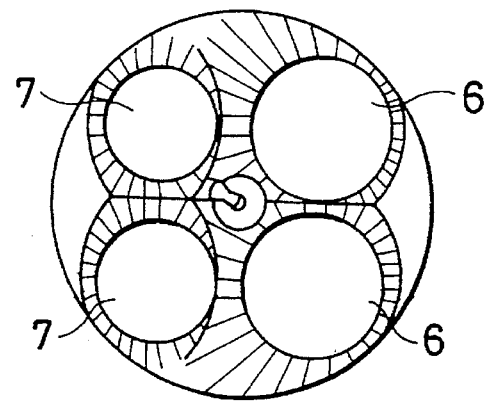
FIG. 8 is an A—A section view of the combustion chamber according to the prior art in FIG. 7.
Figure 9:
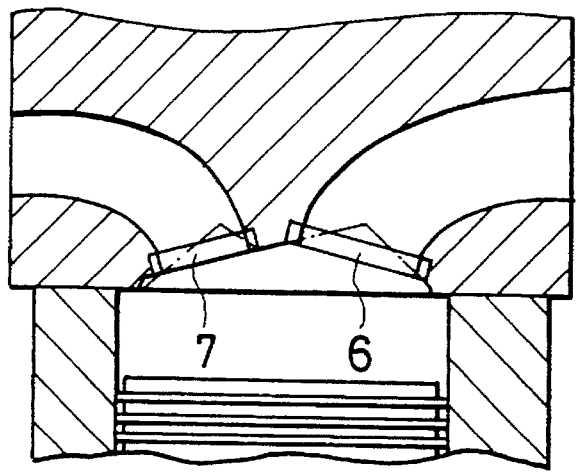
FIG. 9 is a partially sectional view of the C—C section in FIG. 8.
Figure 10:
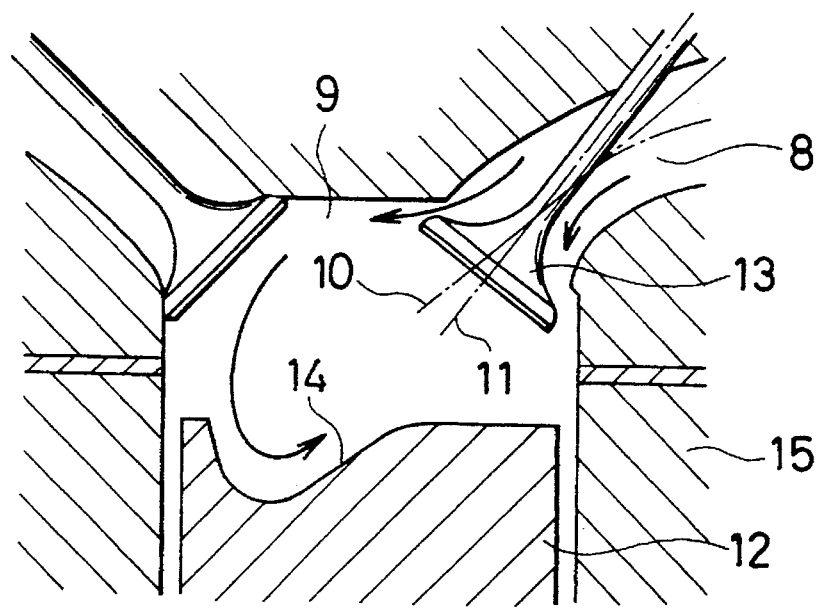
FIG. 10 is a sectional view of an engine according to another prior art.

FIG. 5 and FIG. 6 are drawings showing variations of the fourth embodiment described above. Referring to FIG. 5, separator 26a has been extended as long as possible to the extent not disturbing fuel injection from fuel injector 28 and in FIG. 6, in addition to the variation above, notch 53 is provided at the downstream end of separator 26a exposed to the injected fuel. These variations are aimed at strengthening the deflected stream for generating a stronger tumble.

In summary, the first embodiment according to the present invention provide an induction system of an engine that can generate a tumble efficiently by means of a tumble control valve and the second embodiment provides an improvement of the first embodiment in which modifications are made to the configuration of the combustion chamber. Further, the third embodiment provides a design of the piston that can last the stumble generated by above induction systems as long as possible. Further, the fourth embodiment is an induction system modified in the tumble control valve of the first embodiment.

The combustion chamber described in the preferred embodiments according to the present invention is a pent-roof type combustion chamber, however the aspects of the present invention are also applied to other types of combustion chamber such as multi-hemispherical type.

For example, in case of an engine having a multi-hemispherical type of combustion chamber, with respect to the first embodiment the intake port should be determined in such a way that the center line of the straight portion of the intake port is almost parallel with the valve sheet face of an exhaust valve. Further, with respect to the second embodiment the roof angles $\theta_1$ and $\theta_2$ should be replaced with the angles contained by the axis of the cylinder and the valve sheet faces of the intake and exhaust valves respectively.

Furthermore, in the aforementioned preferred embodiments of the present invention, the fuel system is a so-called port injection type in which the fuel injector is mounted on the intake system, that is to say, fuel is injected before the intake valve. However, those techniques disclosed thereinbefore can be applied to an engine whose fuel system is a so-called direct fuel injection type having an injection nozzle in the combustion chamber.

While the presently preferred embodiments of the present invention has been shown and described, it is to be understood that these disclosures are for the purpose of illustration and that various changes and modifications may be made without departing from the scope of the invention as set forth in the appended claims.

We claim:

1. A fuel injection engine having a combustion chamber with a roof, an intake valve for closing an intake port provided on a first part of said roof of said combustion chamber, an exhaust valve for closing an exhaust port provided on another part of said roof, a cylinder and a piston, the engine comprising:

an air intake passage including a bent portion connected to said intake port;

said air intake passage including a first straight portion and a second straight portion provided upstream of said bent portion, said first straight portion situated in between said second portion and said bent portion; and said air intake passage having a center line in said first straight portion approximately in parallel with said another part of said roof so as to introduce air into said combustion chamber without disturbing a streamline flow of air formed at said first straight portion and to generate a tumble flow of air in said cylinder.

2. The engine according to claim 1, further comprising:

a hemispherical concave provided on the head of said piston whereby tumble flow occurs.

3. A fuel injection engine having a combustion chamber with a roof, an intake valve for closing an intake port provided on a first part of said roof of said combustion chamber, an exhaust valve for closing an exhaust port provided on another part of said roof, a cylinder and a piston, the engine comprising:

an air intake passage including a bent portion connected to said intake port;

an air intake passage including a straight portion provided upstream of said bent portion;

said air intake passage having a center line in said straight portion approximately in parallel with said another part of said roof so as to introduce air into said combustion chamber without disturbing a streamline flow of air formed at said straight portion and to generate a tumble flow of air in said cylinder;

a dividing wall provided in relatively orthogonal direction of an axis of said cylinder at the upstream part of said air intake passage for dividing said air intake passage into a first passage and a second passage, said first passage provided further from said cylinder than said second passage; and a valve for closing said second passage.

4. The engine according to claim 3, wherein said valve is a butterfly valve pivotally connected to an upstream end of said dividing wall and said butterfly valve has a valve disc with a notch on said first passage side for closing said second passage and for opening said first passage to pass air through an opening formed between said notch and a wall of said first passage.

5. A fuel injection engine having a combustion chamber with a roof, an intake valve for closing an intake port provided on a first part of said roof of said combustion chamber, an exhaust valve for closing an exhaust port provided on another part of said roof, a cylinder and a piston, the engine comprising:

said combustion chamber including a first angle contained by said roof face on said roof and an axis of said cylinder, and a second angle contained by a roof face of said other roof and said axis of said cylinder, said first angle being substantially smaller than said second angle; and an air intake passage including a first straight portion and a second straight portion, said first straight portion provided at the upstream part of said air intake passage and a center line of said first straight portion angled approximately orthogonally with said axis of said cylinder.

6. The engine according to claim 5, further comprising:

a hemispherical concave provided on the head of said piston whereby tumble flow occurs.

7. A fuel injection engine having a combustion chamber with a roof, an intake valve for closing an intake port provided on a first part of said roof of said combustion chamber, an exhaust valve for closing an exhaust port provided on another port of said roof, a cylinder and a piston, the engine comprising:

said combustion chamber including a first angle contained by a roof face on said roof and an axis of said cylinder, and a second angle contained by a roof face of said other roof and said axis of said cylinder, said first angle being substantially smaller than said second angle;

an air intake passage including a straight portion provided at the upstream part of said air intake passage and a center line of said straight portion angled approximately orthogonally with said axis of said cylinder;

a dividing wall provided in relatively orthogonal direction of an axis of said cylinder at the upstream part of said air intake passage for dividing said air intake passage into a first passage and a second passage, said first passage provided further from said cylinder than said second passage; and a valve for closing said second passage.

8. The engine according to claim 7, wherein said valve is a butterfly valve pivotally connected to an upstream end of said dividing wall and said butterfly valve has a valve disc with a notch on said first passage side for closing said second passage and for opening said first passage to pass air through an opening formed between said notch and a wall of said first passage.

9. An air intake system for a fuel injection engine which provides a cylinder, a piston, a combustion chamber provided on an end of said cylinder, an intake valve provided on a roof of said combustion chamber and an exhaust valve provided on another roof of said combustion chamber, the system having an intake port communicating with said combustion chamber and an air intake passage communicating with said intake port, the system comprising:

a straight portion provided in said air intake passage;

said straight portion having a center line being in parallel with a plane including a roof face of said other roof so as to induce air into said combustion chamber without disturbing a streamline of said air formed at said straight portion and to generate a tumble flow of said air in said cylinder;

a dividing wall provided relatively orthogonal with an axis of said cylinder in said air intake passage for dividing said air intake passage into a first passage and a second passage, said first passage provided farther from said cylinder than said second passage; and a valve provided on said air intake passage for closing said second passage so as to have a rapid air flow in said first passage when said engine is operated at a predetermined operating condition.

10. The system according to claim 9, wherein:

said combustion chamber includes a first angle contained by said roof and an axis of said cylinder, and a second angle contained by said other roof and said axis of said cylinder; and said first angle is substantially smaller than said second angle.

11. The system according to claim 9, further comprising:

a hemispherical concave provided on a head of said piston so as to keep said tumble for a long time.

12. The system according to claim 9, wherein:

said valve is a butterfly valve pivotally connected to an upstream end of said dividing wall and said butterfly valve has a valve disc with a notch on a side of said first passage for closing said second passage and for passing said air through an opening formed between said notch and a wall of said first passage.

13. A fuel injection engine having a combustion chamber with a roof, an intake valve for closing an intake port provided on a first Dart of said roof, an exhaust valve for closing an exhaust port provided on another part of said roof, a cylinder and a piston, the engine comprising:

an air intake passage including a bent portion connected to said intake port;

a straight portion provided in said intake passage upstream of said bent portion;

said air intake passage having a center line of said straight portion being approximately in parallel with a roof face of said another part of said roof so as to introduce air into said combustion chamber without disturbing a streamline flow formed in said straight portion and to thereby generate a tumble flow in said cylinder;

a dividing wall provided in an upstream part of said air intake passage for dividing said air intake passage into a first passage and a second passage, said first passage provided farther from said cylinder than said second passage; and a valve for closing said second passage.

14. The engine according to claim 13, wherein said valve is a butterfly valve pivotally connected to an upstream end of said dividing wall and said butterfly valve has a valve disc with a notch on said first passage side for closing said second passage and for opening said first passage to pass air through an opening formed between said notch and a wall of said first passage.

15. A fuel injection engine having a combustion chamber with a roof, an intake valve for closing an intake port provided on a first part of said roof of said combustion chamber, an exhaust valve for closing an exhaust port provided on another part of said roof, a cylinder and a piston, the engine comprising:

said combustion chamber including a first angle contained by a roof face on said first part of said roof and an axis of said cylinder, and a second angle contained by a roof face of said another part of said roof and said axis of said cylinder, said first angle being substantially smaller than said second angle;

an air intake passage including a straight portion provided in an upstream part of said air intake passage and a center line of said straight portion being angled approximately orthogonally with said axis of said cylinder;

a dividing wall provided at an upstream part of said air intake passage for dividing said air intake passage into a first passage and a second passage, said first passage provided farther from said cylinder than said second passage; and a valve for closing said second passage.

16. The engine according to claim 15, wherein said valve is a butterfly valve pivotally connected to an upstream end of said dividing wall and said butterfly valve has a valve disc with a notch on said first passage side for closing said second passage and for opening said first passage to pass air through an opening formed between said notch and a wall of said first passage.

* * * * *